Dec. 9, 1952     C. F. SEIFERT     2,620,586
FISHING ROD
Filed April 30, 1951
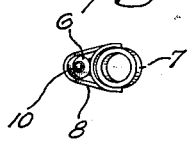
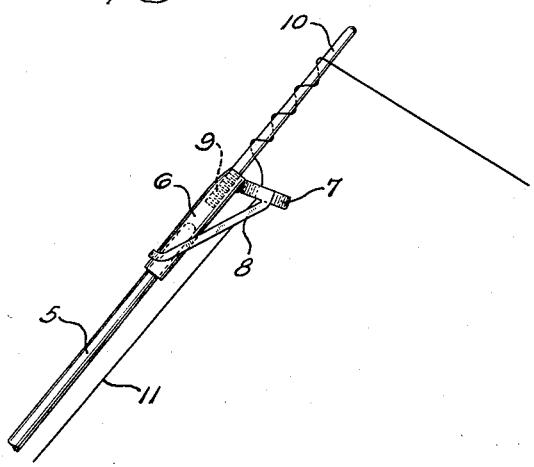
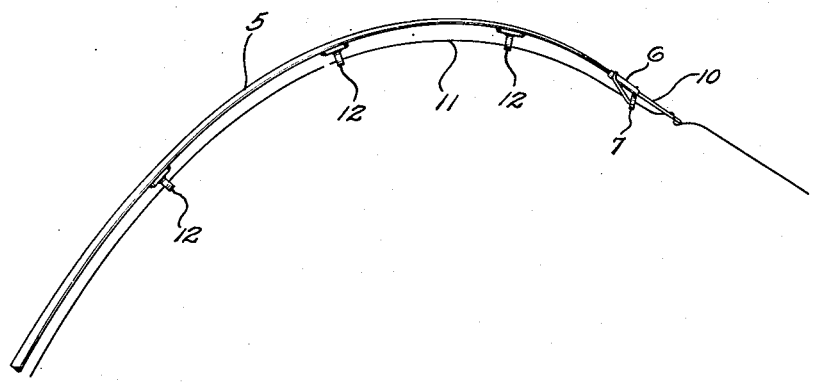
INVENTOR.
Charles F. Seifert,
BY Morsell & Morsell
ATTORNEYS.

Patented Dec. 9, 1952

2,620,586

UNITED STATES PATENT OFFICE 2,620,586

FISHING ROD

Charles F. Seifert, Milwaukee, Wis.

Application April 30, 1951, Serial No. 223,715

3 Claims. (Cl. 43—24)

1

This invention relates to improvements in fishing rods, and more particularly to a line guide extension for a fishing rod to especially adapt the rod for trolling.

Many persons, when alone, desire to fish from a rowboat by trolling. The fisherman must, however, man the oars to propel the boat and the usual practice is to incline the fishing rod in the boat unattended and with a sufficient length of line played out into the water. The fisherman will row until there is a strike whereupon he must drop the oars, grasp the fishing pole, and then attempt to set the hook and play and eventually land the fish. The difficulty with this usual practice of solitary trolling is that before the fisherman can release the oars and grasp the unattended fishing rod, when there is a strike, it may be too late to set the hook or the line may run out from the fishing rod reel too freely. In some instances the fisherman may have set the click on the reel but this does not always suffice.

With the foregoing in mind, a general object of the invention is to provide a line guide extension for a fishing rod whereby the rod, if set down in the boat unattended for trolling purposes, while the fisherman is rowing, will prevent the line from running out too freely if a strike is encountered and will also offer sufficient resistance to cause setting of the hook. The improved line guide extension for fishing rods, in addition to the foregoing, if a strike from a large fish is encountered, will, through the flexing of the fishing rod, then permit the line to run out so that the fish cannot snap the line before the oarsman can reach and attend to the fishing rod and the necessary playing of the fish.

A further more specific object of the invention is to provide a fishing rod line guide extension with which standard fishing rods may be readily equipped and which will not unduly interfere with casting operations, or which may be incorporated in a rod when manufactured as a standard part thereof.

A further more specific object of the invention is to provide a fishing rod line guide extension which is readily removable from the outer end of the fishing rod when desired.

A further object of the invention is to provide a fishing rod line guide extension which is of very simple construction, which is inexpensive, which is automatic in its operation, which does not detract from the appearance or service of a fishing rod, and which is well adapted for the purposes described.

With the above and other objects in view the in-

2 vention consists of the improved fishing rod line guide extension and its parts and combinations as set forth in the claims, and all equivalents thereof.

In the accompanying drawing in which the same reference characters indicate the same parts in all of the views:

Fig. 1 is a fragmentary side view of the outer end portion of a fishing rod equipped with the improved line guide extension showing the manner in which a fish line is guided and engaged thereby;

Fig. 2 is a fragmentary side view, on a smaller scale, of an outer end portion of a fishing rod equipped with the improved line guide extension in bowed or flexed condition as when a large fish strike is encountered, showing the manner in which the line is frictionally played off of the extension; and Fig. 3 is an end view of the outer end of a fishing rod equipped with the improved line guide extension.

Referring first to Fig. 1 of the drawing the outer end portion of a fishing rod is indicated by the numeral 5 and the same is equipped with a tip which includes a cylindrical sleeve 6 secured onto the tapered extremity of the fishing pole 5. As is usual, the tip sleeve 6 has integral with its outer end portion and extending laterally therefrom an eyed line guide 7 provided with a support 8 which extends and is secured to a lower portion of the sleeve 6. The tip assemblage just described is similar to the conventional tips on the ends of fishing rods except that the sleeve portion 6 thereof is preferably somewhat longer. Also, the outer end portion of the sleeve 6 is formed with a socket 9 which is preferably internally threaded.

The feature of the present invention is an extension 10 in the form of a slightly outwardly tapered shaft which, when the socket 9 is internally threaded, is formed at its inner end with screw threads, to engage in said threaded socket, as in Fig. 1. In lieu of the threaded socket and the screw threads on the inner end of the extension 10, however, the extension 10 may merely have a force or frictional fit within the socket, but preferably the extension is removable from the tip end of the fishing rod.

For trolling purposes the fish line 11, extending lengthwise of the fishing pole 5 from a conventional reel (not shown) is extended through eyed guides 12 along the rod and then through the angularly disposed guide 7 carried by the sleeve 6. Beyond said guide 7 the line 11 is given a few turns or wraps about the extension 10 and therebeyond the line with the end thereof which carries the bait or lure (not shown) is extended into the water and is intended to be played out for a suitable length so as to be dragged through the water behind the stern of the boat which, in solitary trolling, is rowed by the fisherman. In this type of fishing, while the fisherman is rowing, the rod is stationed in the boat at an upward angle unattended. The improved extension 10 with the illustrated turns of the line 11 thereabout (Fig. 1) prevents the line from undesirably playing out while the fisherman is rowing because the extension 10 is then directed at approximately a 90° angle to the line. Should a fish strike the bait or lure while the rod is unattended, the wrapping of the line about the extension 10 will offer sufficient resistance so that the hook will become set and the line will not undesirably run out. This permits the oarsman, when he observes the strike, to drop the oars and grasp the fishing rod and then reel in or otherwise play the fish while maintaining a taut line.

Should the fish which has struck the lure carried by the line 11 on the unattended pole be of large size, the situation depicted in Fig. 2 will attain. In this event the tug of the fish will cause the rod 5 to flex or bow as in Fig. 2, whereupon the portions of the line which were wrapped about the extension 10, which is then extending in the same general direction as the line, can slip off, offering some resistance to set the hook while so doing, then permitting sufficient line to run out so that the line will not be snapped before the oarsman can grasp the pole and devote his attentions to landing the fish.

The improved line guide extension for fishing rods, as will be obvious from the foregoing explanation, adapts a standard fishing rod for unattended trolling purposes in a boat having but a single occupant and prevents fish from not being hooked and lost before the rod can receive the attention of the oarsman. The line guide extension is furthermore simple and effective and automatic in its functioning, and is well adapted for the purposes described.

What is claimed as the invention is:

1. A line guide and ferrule tip for the outer end of a fishing rod, comprising a sleeve to be secured on the outer end of a fishing rod, a laterally projecting eyed guide for a fish line carried by said sleeve, the outer end portion of said sleeve having an internally threaded socket therein, and a straight shaft having a straight unobstructed smooth surfaced portion for a substantial distance inwardly from its outer end and having its inner end threaded within said socket to form an axial extension of a fishing rod and adapted to receive wrappings of fish line extended beyond said eyed guide.

2. In a flexible fishing rod having an eyed line guide at its outer end, said rod being adapted to have a line threaded through said guide, a trolling extension having an unobstructed, smooth surfaced portion for a substantial distance inwardly of its outer end secured to and projecting beyond said eye in the same general direction as the outer portion of the rod and shaped to receive and temporarily hold convolutions of line outwardly of said eyed guide to normally prevent withdrawal of the line when the portion of the line beyond said convolutions is extending away from the rod in a generally transverse direction and is not under abnormal stress, said smooth surfaced portion of the extension being shaped to permit said convolutions to slip off of the outer end of the extension only when the pole is substantially flexed due to a pull on the line.

3. A line guide and ferrule tip for the outer end of a fishing rod comprising a sleeve to be secured to the outer end of a fishing rod, a laterally projecting eyed guide for a fish line carried by said sleeve, a trolling extension having an unobstructed smooth surfaced portion for a substantial distance inwardly of its outer end secured to and projecting in a generally axial direction from said sleeve beyond said eyed guide, said smooth surfaced portion being shaped to receive and temporarily hold convolutions of line when the line there-beyond is extending in a generally transverse direction away from said extension and is not under abnormal stress, said smooth-surfaced portion being shaped to permit convolutions to slip off of the outer end of the extension only when the axis of the extension is in the general direction of extent of the line therebeyond.

CHARLES F. SEIFERT.

REFERENCES CITED

The following references are of record in the file of this patent:

UNITED STATES PATENTS

| Number | Name | Date |
|---|---|---|
| 760,181 | Buschemeyer | May 17, 1904 |
| 2,084,251 | Haislip | June 15, 1937 |
| 2,305,176 | Littman | Dec. 15, 1942 |
| 2,447,720 | Thomas | Aug. 24, 1948 |
| 2,536,388 | Murray | Jan. 21, 1951 |
| 2,546,079 | Seviola | Mar. 20, 1951 |
| 2,597,738 | Koos | May 20, 1952 |

FOREIGN PATENTS

| Number | Country | Date |
|---|---|---|
| 612,193 | France | July 26, 1926 |